United States Patent
Sauter et al.

(10) Patent No.: US 7,539,189 B2
(45) Date of Patent: May 26, 2009

(54) APPARATUS AND METHODS FOR SUPPORTING 802.1X IN DAISY CHAINED DEVICES

(75) Inventors: Susan M. Sauter, Murphy, TX (US); Jason D. Frazier, Raleigh, NC (US); Cynthia D. Melter, Santa Cruz, CA (US); Gregory Alan Moore, Sedalia, MI (US); Ian Foo, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 11/582,786

(22) Filed: Oct. 17, 2006

(65) Prior Publication Data
US 2008/0034407 A1 Feb. 7, 2008

Related U.S. Application Data

(60) Provisional application No. 60/821,015, filed on Aug. 1, 2006.

(51) Int. Cl.
*H04L 12/28* (2006.01)
(52) U.S. Cl. .................. 370/389; 709/225; 713/153
(58) Field of Classification Search .................. None
See application file for complete search history.

(56) References Cited

U.S. PATENT DOCUMENTS

| | | | |
|---|---|---|---|
| 7,058,973 B1 * | 6/2006 | Sultan | 726/12 |
| 7,150,040 B2 * | 12/2006 | Brownell | 726/11 |
| 7,234,163 B1 * | 6/2007 | Rayes et al. | 726/22 |
| 2005/0163131 A1 * | 7/2005 | Tonnby et al. | 370/395.53 |
| 2005/0190775 A1 * | 9/2005 | Tonnby et al. | 370/401 |
| 2006/0251055 A1 * | 11/2006 | Monette et al. | 370/352 |
| 2007/0180081 A1 * | 8/2007 | Okmianski et al. | 709/223 |
| 2007/0256122 A1 * | 11/2007 | Foo et al. | 726/5 |

OTHER PUBLICATIONS

Draft Standard for Local and Metropolitan Area Networks—Port Based Access Control (Revision), IEEE P802.1X-REV/D11, Jul. 22, 2004.

(Continued)

*Primary Examiner*—Bob A Phunkulh
(74) *Attorney, Agent, or Firm*—Weaver Austin Villeneuve & Sampson LLP (57) ABSTRACT

Disclosed are apparatus and methods for authenticating a device to access a network through an access control port. In one embodiment, one or more first authentication packets for authenticating a first device or user to access a first network domain via a particular access port of a network device are received, for example, by an access control port. The particular access port is configured to control access for packets attempting to ingress into one or more network domains. When the first device or user is authorized to access the first domain, a first binding between the first device and the first domain is formed. The first binding specifies that the first device is allowed to access the first domain and the first binding is associated with the particular access port of the network device. When a packet is received that is attempting to ingress into the first domain and the ingressing packet matches the first binding, the ingressing packet is allowed to access the first domain. In contrast, when a packet is received that is attempting to ingress into the first domain and the ingressing packet does not match the first binding, the ingressing packet is blocked from accessing the first domain.

19 Claims, 6 Drawing Sheets

OTHER PUBLICATIONS

SonicWall Tech Notes CDP Frequently Asked Questions, http://www.sonicwall.com/downloads/SonicWALL_CDP_FAQ, Jul. 1, 2006.

Search Report and Written Opinion dated Sep. 16, 2008 for International Application No. PCT/US07/17081.

* cited by examiner

| Entry | Port | Source MAC | VLAN | Action |
|---|---|---|---|---|
| N-2 | 1 | A | 1 | Allow |
| N-1 | 1 | B | 2 | Allow |
| N | 1 | Any | Any | Drop |

APPARATUS AND METHODS FOR SUPPORTING 802.1X IN DAISY CHAINED DEVICES

RELATED APPLICATION DATA

The present application claims priority under 35 U.S.C. 119(e) to U.S. Provisional Patent Application No. 60/821,015, filed Aug. 1, 2006.

BACKGROUND

The present invention relates to point-based network access control. More particularly, it relates to authentication and authorization of a device attached to a local area network (LAN) via an access control port in order to provide such network access.

A LAN may be set up to allow an unauthorized device to attach to the LAN infrastructure or an unauthorized user to attempt to access the LAN through a device that is attached to the LAN. For example, a business corporation may allow an outside visitor to connect to the corporation LAN. When an unauthorized user or device is allowed to attempt LAN connectivity, access may be restricted so that only particular authorized users and/or devices may utilize particular services offered by the LAN. That is, some form of network access control is typically implemented when providing LAN connectivity for unauthorized users and devices.

The 802.1X protocol describes a mechanism for providing network access control, and this protocol is described in "DRAFT Standard for Local and Metropolitan Area Networks—Port Based Access Control (Revision), IEEE P802.1X-REV/D11, Jul. 22, 2004, which document is incorporated herein by reference in its entirety. The 802.1X protocol describes a port-based network access control that makes use of the physical access characteristics of IEEE 802 Local Area Networks (LAN) infrastructures in order to provide a way of authenticating and authorizing a device attached to a LAN port that has point-to-point connection characteristics, and of preventing access to that port in cases in which the authentication and authorization process fails. The 802.1X protocol currently assumes a single device is plugged into a port and, thereby, only supports one supplicant per port.

BRIEF DESCRIPTION OF THE DRAWINGS

The present invention is illustrated by way of example, and not by way of limitation.

DESCRIPTION OF EXAMPLE EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Overview

In one embodiment, a method is disclosed. One or more first authentication packets for authenticating a first device or user to access a first network domain via a particular access port of a network device are received, for example, by an access control port. The particular access port is configured to control access for packets attempting to ingress into one or more network domains. When the first device or user is authorized to access the first domain, a first binding between the first device and the first domain is formed. The first binding specifies that the first device is allowed to access the first domain and the first binding is associated with the particular access port of the network device. When a packet is received that is attempting to ingress into the first domain and the ingressing packet matches the first binding, the ingressing packet is allowed to access the first domain. In contrast, when a packet is received that is attempting to ingress into the first domain and the ingressing packet does not match the first binding, the ingressing packet is blocked from accessing the first domain. In other embodiments, the invention pertains to an apparatus having one or more processors and one or more memory, wherein at least one of the processors and memory are adapted for performing the above described method operations.

Specific Example Embodiments

In general, example embodiments of the present invention allow authorization for a particular device or user to have access into a particular network so as to be bound to a specific domain or VLAN (virtual local area network). When authorization is tied to a domain, several devices can be authenticated into a single physical port of a network access device (e.g., access switch) and still only be given access to the domain or VLAN that they are authorized to access based on their individual independent authentications.

Figure 1:
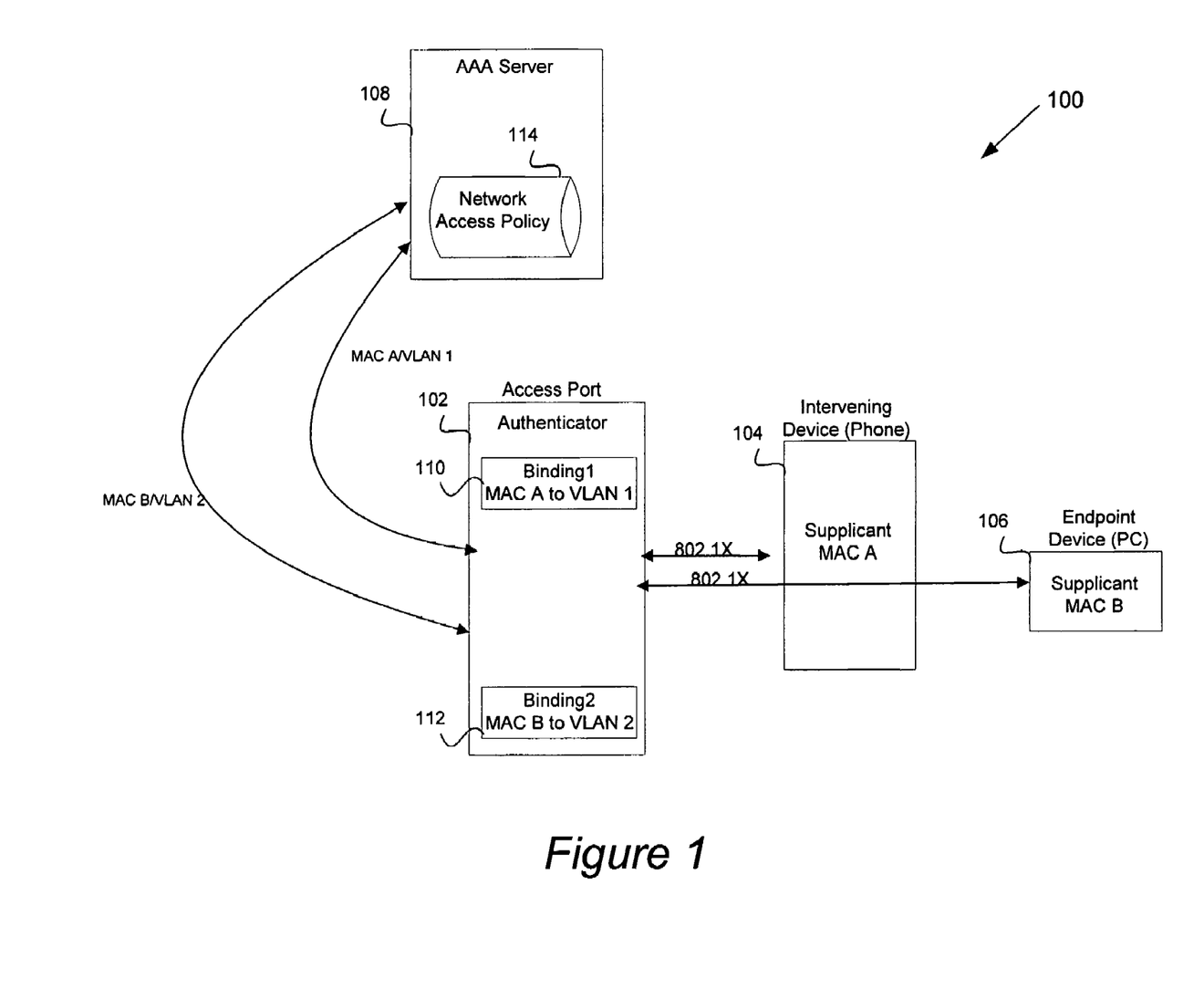
FIG. 1 illustrates a network portion in which authentication embodiments of the present invention may be implemented.

Techniques for domain- or VLAN-dependent authorization on a single port may be implemented in any suitable manner and depends on the particular protocols and/or applications being utilized by the particular network access device. FIG. 1 illustrates a network portion 100 in which authentication embodiments of the present invention may be implemented. In this configuration, two devices are chained together and one of the devices is coupled to an access port 102 of a network device, such as an access switch (not shown). For instance, endpoint device or personal computer (PC) 106 is coupled to intervening device or VoIP (voice over internet protocol) phone 104, which is coupled to the access port 102. Of course, the PC 106 may serve as the intervening device, instead of the IP phone 104. In general, any type of device may be utilized as an intervening or endpoint device. Additionally, more than two chained devices may also be contemplated if more than two domains or VLAN's are provided through such access port 102. Other configurations, such as a plurality of devices coupled in a ring, star, or star bus pattern, or in parallel to the access port, or one or more devices using wireless port access, are also contemplated.

In the illustrated example, the access port 102 and devices negotiate network access using the protocol 802.1X although any suitable access protocol may be utilized. Accordingly, the 802.1X "supplicant" and "authenticator" terms will be utilized herein, and are not meant to limit the scope of the invention to this particular protocol. A supplicant generally obtains or attempts to gain permission from an authenticator to gain access to a particular network, such as a local area network. In embodiments of the present invention, a supplicant can seek permission from an authenticator to gain access to a particular domain or VLAN. In the illustrated example, access port 102 serves as an authenticator while each device 104 and 106 acts as a supplicant to gain access to two respective VLAN's: a voice VLAN 1 and a data VLAN 2, respectively.

In the example of FIG. 1, VoIP Phone 104 can authenticate into the voice VLAN 1 by implementing an 802.1X supplicant. The phone can also provide "pass-through" connectivity for downstream device 106 before or after the phone has authenticated into the network. The downstream device can authenticate on the data VLAN 2. In this example, endpoint device 106 has a media access control (MAC) address "MAC B", while intervening device 104 has MAC address "MAC A." Intervening device 104 authenticates with the access port 102 to obtain access to the voice VLAN 1, while endpoint device 106 authenticates with the access port 102 to obtain access to the data VLAN 2. During authentication of intervening device 104, a binding may be formed between MAC A and VLAN 1 in the form of Binding1 110. Likewise, a binding (Binding2 112) may be formed between MAC B and VLAN 2 for authentication of endpoint device 106. These two binding may be integrated together into an access control list (ACL). Authentication for both devices 104 and 106 may be authorized by an authentication, authorization, and accounting (AAA) server 108 based on a network access policy 114 or preconfigured in the access port 102 or network device (e.g., switch) so as to be accessible to the port 102.

Authenticating two different devices into two different VLAN's on the same access port may be accomplished any suitable manner. For instance, the supplicant may directly or indirectly request authentication on a certain VLAN. In a direct request, the supplicant sends a request to access a specific VLAN. That is, the request includes a field specifying a VLAN that the requesting device is attempting to access. In an indirect request, the supplicant does not specify the VLAN for which it is seeking authorization, and the supplicant's VLAN is preconfigured in the AAA server or access port based on the supplicant's identity, e.g., MAC address. The later example would work well in current embodiments of the 802.1X protocol, where a supplicant does not specify a VLAN during an authentication procedure.

Figure 2:
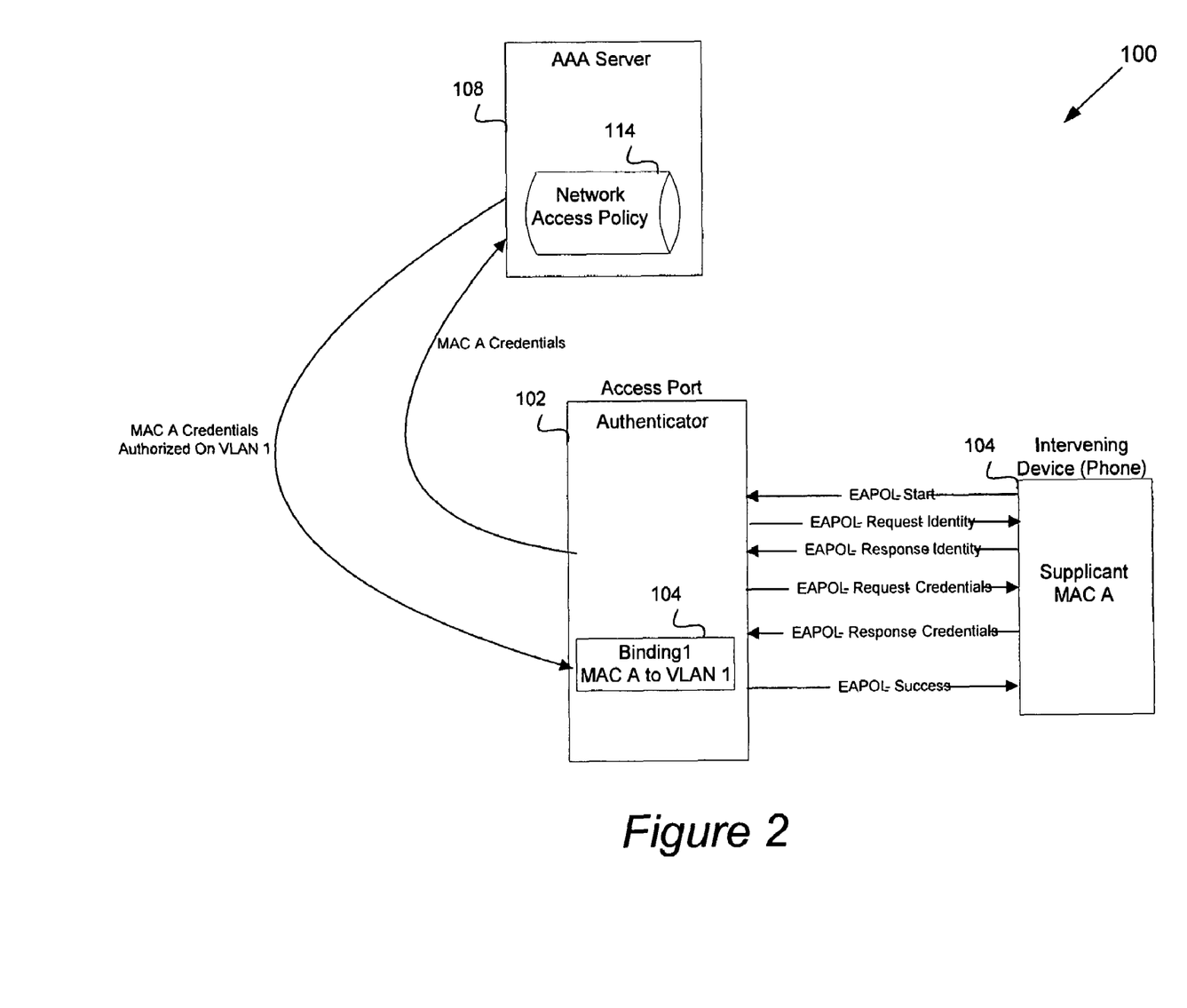
FIG. 2 illustrates an example message exchange between the intervening device and the access port of FIG. 1.

FIG. 2 illustrates an example message exchange between the intervening device 104 and the access port 102 of FIG. 1. In this example, 802.1X messages are exchanged during authentication of the intervening device 104, and during such exchange the access port in configured to set up permission for the supplicant 104 to access VLAN 1 through access port 102. A similar message exchange may occur for authentication of the endpoint device 104 with the intervening device 104 passing such messages between the endpoint device 104 and the access port.

This message exchange generally takes place between a supplicant port access entity (PAE), e.g., the endpoint device or the intervening device, and the authenticating PAE, e.g., the access port. The packet format that is applied to 802.1X packets during this authentication process is referred to as "encapsulation authentication protocol (EAP) over LAN" or EAPOL. Of course, other authentication formats are also contemplated.

In an EAPOL message exchange between a supplicant and authenticator, either the supplicant or the authenticator may initiate the exchange. In the present example, the supplicant, i.e., intervening device 104, initiates by sending an EAPOL-Start packet to the access port or authenticator 102. The authenticator may then make any number and type of requests to authenticate the supplicant. As shown, the authenticator 102 sends an EAPOL-Request Identity packet to obtain an identity of the supplicant and an EAPOL-Request Credentials packet to obtain credential information from the supplicant. The identity of the supplicant is returned to the authenticator by the supplicant in an EAPOL-Response Identity packet, while credentials for the supplicant are returned by the supplicant to the authenticator in an EAPOL-Response Credentials packet. In general, any type of information may be requested by the authenticator and obtained from the supplicant, such as passwords, device identity, certificates, etc.

During the EAPOL message exchange, the authenticator may determine whether the supplicant is authorized for accessing a particular VLAN in any suitable manner. For example, the access port 102 may be configured with information indicating which supplicant devices are authorized to access which VLAN or may obtain such information from any suitable source. In the illustrated example, the access port or authenticator 102 sends the supplicant's credential information to the AAA server 108 and then receives information indicating that the supplicant/MAC A is authorized to access VLAN 1. That is, the supplicant's MAC address is matched to a VLAN. Of course, any other identifying information associated with the supplicant may be matched to a particular VLAN. A binding between the supplicant (e.g., MAC A) and authorized VLAN may then be formed. In contrast, if the supplicant is not authorized for any VLAN, the AAA Server 108 may indicate that the supplicant is not authorized and a binding for the supplicant is not formed.

The intervening device 104 may also be configured to forward packets addressed with the 802.1X multicast address to both the endpoint device (or any other devices that are chained to it) and to the internal management port of the intervening device on which it receives packets. The supplicant devices may generally send their EAPOL messages to the 802.1X multicast address. However, the messages sent by the authenticator after the initial EAPOL-Request Identity message may be sent to the supplicant's unicast address since the 802.1X protocol may not provide an addressing schema and may assume a point-to-point connection between a single authenticator/supplicant pair.

Figure 3:
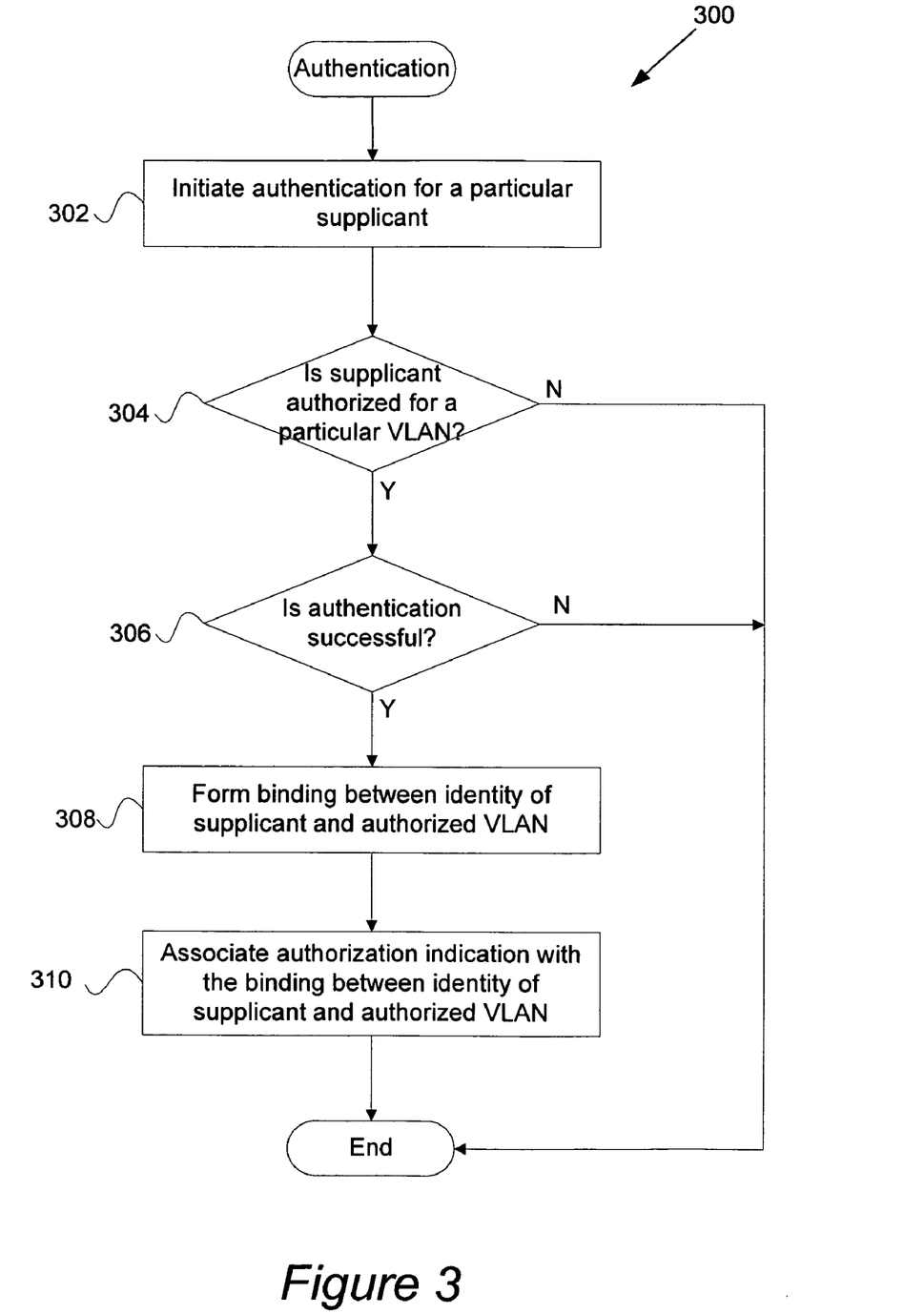
FIG. 3 is a flow chart illustrating an authentication procedure in accordance with one embodiment of the present invention.

FIG. 3 is a flow chart illustrating an authentication procedure 300 in accordance with one embodiment of the present invention. This authentication procedure 300 may be repeated for any number of supplicants and may also be repeated for a same supplicant. That is, the access port may be configured to periodically re-authenticate each authorized device. Additionally, a plurality of devices may authenticate in any suitable order. Referring to FIG. 3, authentication is initiated for a particular supplicant in operation 302. The authenticator or access control port or the supplicant may initiate such process. For instance, when a device is coupled to the access port and enabled, the enabled device may inform the access control port that it is enabled. In response to this enablement, the authenticator may initiate the authentication process by sending an EAPOL-Start packet, for example. Alternatively, the newly enabled device may initiate authentication after it starts up or is enabled.

It is then determined whether the supplicant is authorized to access a particular VLAN in operation 304. For instance, the authenticator obtains information from an AAA server indicating whether the supplicant is authorized for a particular VLAN. In one example preconfiguration of the AAA server (or access control port), an IP phone device is matched with a voice VLAN, while a PC device is matched with a data VLAN. If the supplicant is not authorized for a particular VLAN, the authentication procedure may end. Alternatively, the supplicant may be proactively blocked from accessing all VLAN's available through the access port. In one embodiment, the access port is pre-configured to block all devices from accessing or ingressing onto all VLAN's until a particular supplicant is authenticated.

When a particular supplicant is determined to be authorized for a particular VLAN, it may also be determined whether authentication is successful for the current supplicant in operation 306. For example, the authenticator carries out any suitable authentication or credential validation procedures, such as password or certification verification, in addition to authorizing the supplicant with respect to a particular VLAN. Of course, the authentication of the supplicant with a certain VLAN may take place after all other credentials have been authenticated or at any point during or after such authentication of other credentials. If authentication is not successful, the procedure may end.

Figure 4:
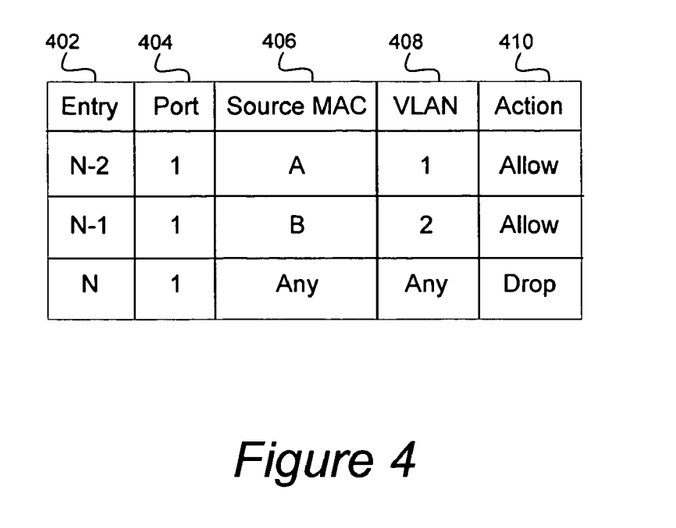
FIG. 4 illustrates one example of a data structure for indicating access control for one or more supplicants on a per VLAN basis with respect to a particular access control port in accordance with a specific implementation of the present invention.

If authentication is successful, a binding between the identity of the supplicant and the authorized VLAN may be formed in operations 308, and an authorization indicator may then be associated with such binding in operation 310 and the procedure ends. Any type of associative structure may be utilized to indicate that a particular authenticated supplicant is now authorized to access a particular VLAN through a particular access control port. FIG. 4 illustrates one example of a data structure for indicating access control for one or more supplicants on a per VLAN basis with respect to a particular access control port in accordance with a specific implementation of the present invention. This data structure serves to filter ingressing packets so as to allow access for particular devices on specific VLANs, while blocking other ingressing packets. Such a data structure may be implemented in any suitable manner, e.g., via software or hardware, such as a ternary CAM (content addressable memory) or TCAM.

As shown for each entry, the data structure of FIG. 4 includes an entry identifier 402, a port identifier 404, a source MAC address 406, a VLAN identifier 408, and an action 410 that specifies the action to be performed for a packet having the specified MAC address and VLAN. In the example of FIG. 4, an entry specified by "N" for Port 1 may specify that any ingressing packets identified by any MAC address for any VLAN is dropped. After intervening device and endpoint device of FIGS. 1, 2, and 5 authenticates for accessing VLAN 1 and 2, respectively, an entry N-1 is created for Port 1 that specifies that a device having MAC A is allowed to access VLAN 1. Likewise, an entry N-2 is created for Port 1 that specifies that a device having MAC B is allowed to access VLAN 2.

Figure 5:
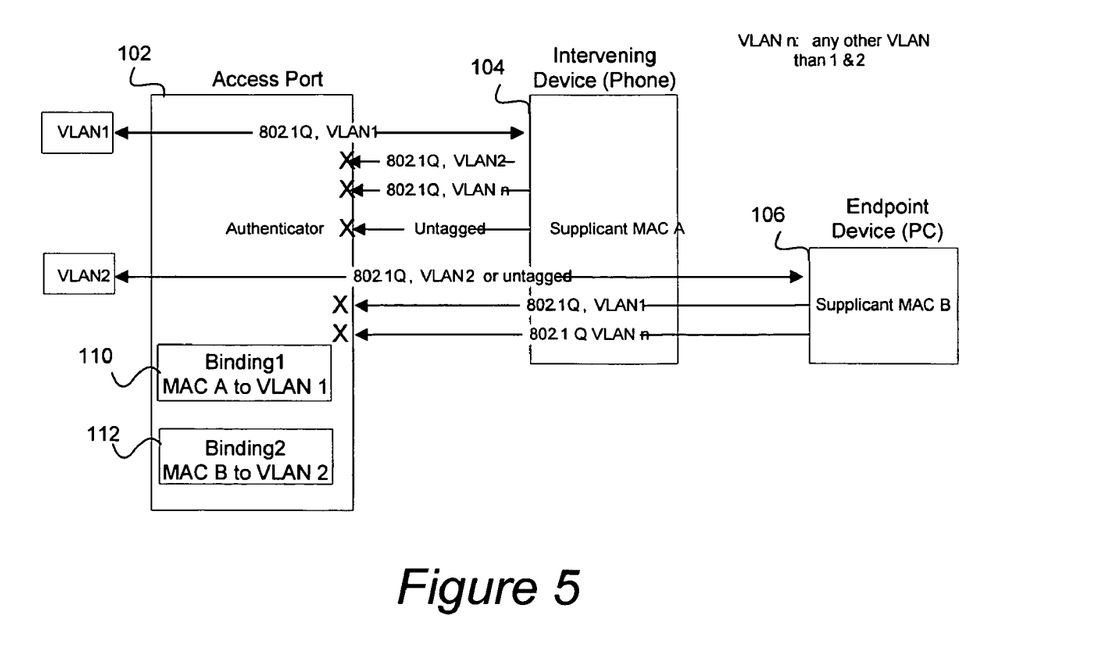
FIG. 5 illustrates mechanisms for providing port access control for a plurality of devices based on the data structure of FIG. 4.
Figure 6:
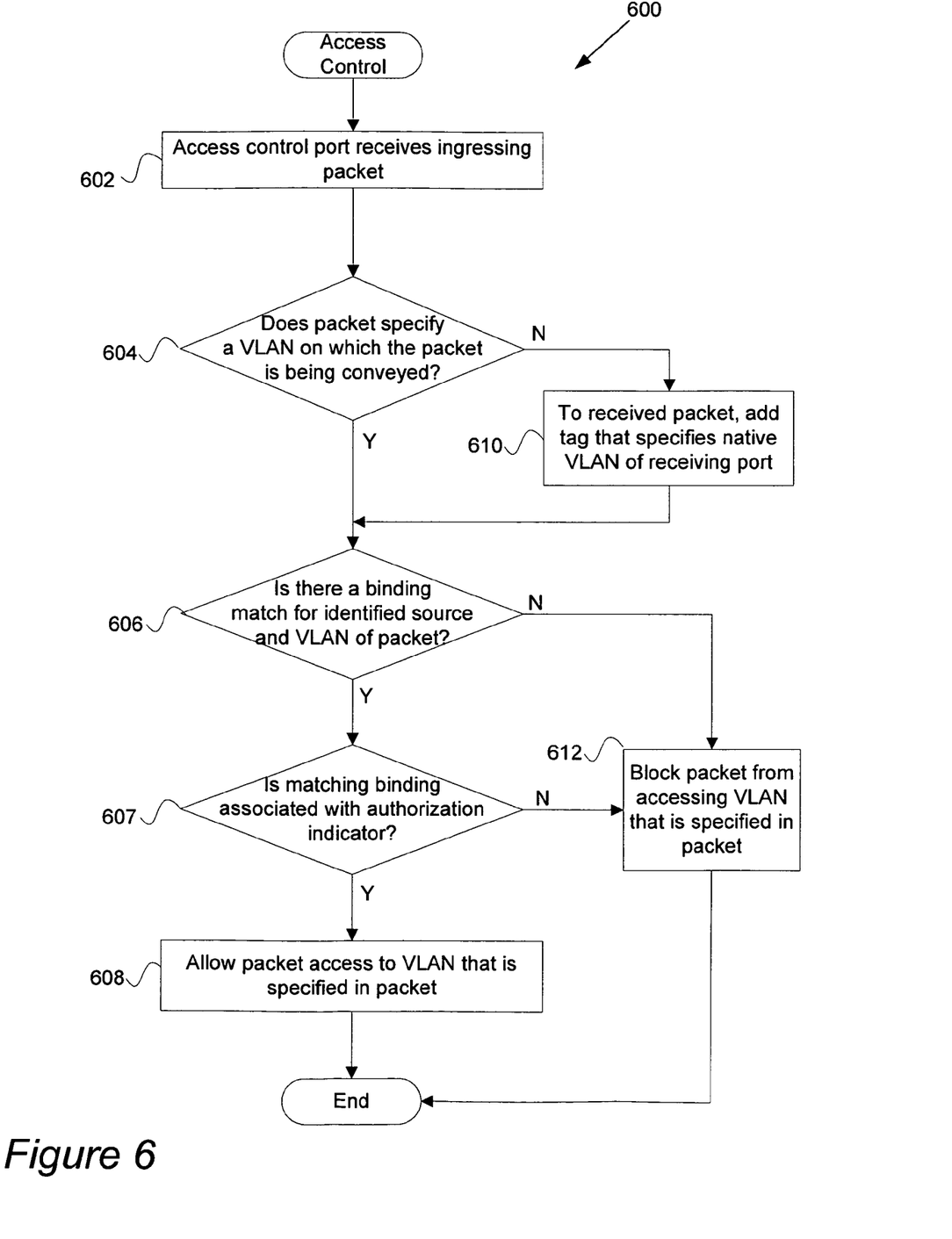
FIG. 6 is a flow chart illustrating a port access control procedure in accordance with one example embodiment of the present invention.

FIG. 5 illustrates mechanisms for providing port access control for a plurality of devices based on the data structure of FIG. 4. FIG. 6 is a flow chart illustrating a port access control procedure in accordance with one example embodiment of the present invention, and FIGS. 5 and 6 will be described together to clarify embodiments of the present invention. Initially, an access control port, such as port 102, receives an ingressing packet in operation 602. That is, a device, such as intervening device 104 or endpoint device 106, is attempting to access a VLAN through access port 102. For example, IP phone 104 or PC 106 may attempt to communicate with another IP phone or PC on a VLAN via access port 102.

Some of the ingressing packets will contain 802.1P/Q tagging that includes a VLAN on which the packet is being conveyed, while other packets will remain untagged. An endpoint device, such as a PC, may be unaware of 802.1P/Q tagging. However, this tagging allows the network infrastructure to route and provide Quality of Service (QoS) for different types of traffic through the network. Accordingly, endpoint devices may send untagged packets. The switch or network device's access port, which receives these untagged packets, may then add an 802.1P/Q tag. This added tag would include the native VLAN for the port which receives the packet. Typically, the switch can be configured on a port-by-port basis with a Native VLAN. Any untagged packet received on a particular port can then be tagged to include the native VLAN of such receiving port.

Referring to FIG. 6, after an ingressing packet is received, it may be determined whether the packet specifies a VLAN on which the packet is being conveyed, e.g., within an 802.1P/Q tag, in operation 604. A device may obtain its authorized VLAN in any suitable manner, e.g., the device may be configured with its authorized VLAN or via the protocol CDP (Cisco Discovery Protocol). If a VLAN is not specified in the packet, a tag having the native VLAN may be added to the received packet in operation 610. If a VLAN is specified or after a tag is added, it may then be determined whether there is a binding match for the source (e.g., MAC address of sending device) and VLAN identified for the packet in operation 606. If there is a binding match found, it is then determined whether the matching binding is associated with an authorization indicator in operation 607. If there is no binding match or a found binding match does not have an authorization indicator, the packet is blocked from accessing the VLAN that is specified in the packet in operation 612. In effect, the packet is blocked from access any network associated with the access port. Otherwise, the packet is allowed access to only the VLAN specified in the packet in operation 608. The procedure 600 may be repeated for any number of received packets that are attempting to ingress into a VLAN of the access port.

In the example of FIG. 5, the access port 102 is associated with a first binding 110 between MAC A and VLAN 1 and a second binding 112 between MAC B and VLAN 2. With this binding or ACL arrangement, only data (e.g., VoIP data) that specifies VLAN 1 from intervening device 104 (MAC A) is allowed access to VLAN 1. In contrast, data that specifies a different VLAN (e.g., VLAN 2 or VLAN n) from the intervening device 104 (MAC A) or a VLAN other than VLAN 2 (e.g., VLAN n) from the endpoint device 106 (MAC B) is blocked. Data that specifies VLAN 1 from the endpoint device 106 (MAC B) is also blocked.

Similarly, only data that specifies VLAN 2 from endpoint device 106 (MAC B) is allowed access to VLAN 2. In contrast, data that specifies a different VLAN (e.g., VLAN 1 or VLAN n) from the endpoint device 106 (MAC B) or a VLAN other than VLAN 1 (e.g., VLAN n) from the intervening device 104 (MAC A) is blocked, and data that specifies VLAN 2 from the intervening device 104 (MAC A) is also blocked.

In both cases, untagged data from the intervening device 104 (MAC A) (e.g., if the device does not support 802.1X) is also blocked from accessing VLAN 1 and 2. However, untagged packets from the endpoint device 106 (MAC B) will be accepted and placed on VLAN 2 when VLAN 2 is configured as the associated Native VLAN of the access port (as shown).

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the authentication systems of this invention may be specially configured switch such as the Catalyst 6500, 4900, 4500, 3750, 3560, or Express 500 Series available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 7:
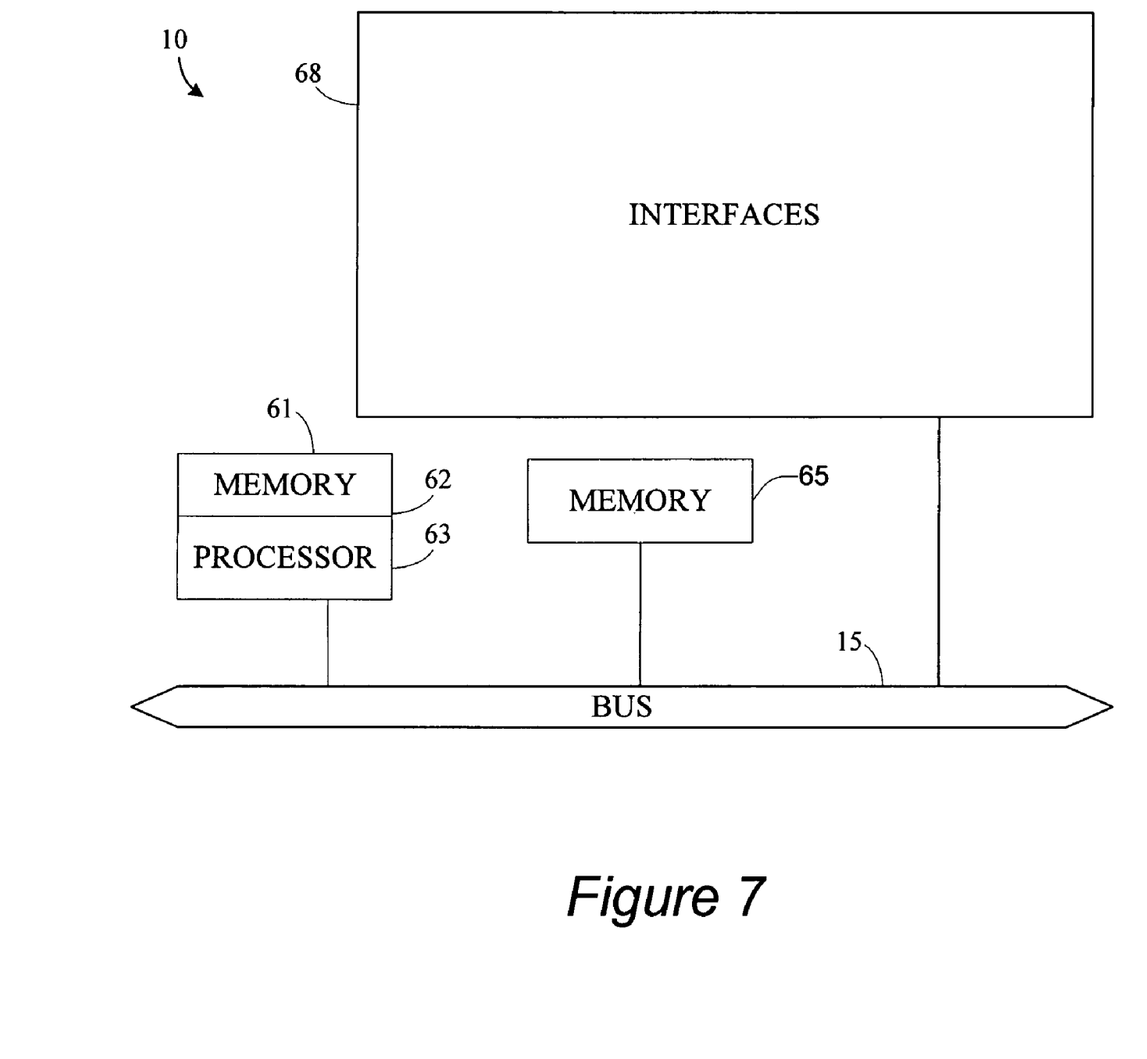
FIG. 7 illustrates an example switch suitable for implementing embodiments of the present invention.

Referring now to FIG. 7, a switch 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of switch 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the switch 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 62 to efficiently perform switching and/or routing computations, network diagnostics, security functions, etc.

Although the system shown in FIG. 7 is one specific switch of the present invention, it is by no means the only switch architecture on which the present invention can be implemented. For example, an architecture having a single processor that handles communications as well as switching and/or routing computations, etc. is often used. Further, other types of interfaces and media could also be used with the switch.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store VSAN information, ACL information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Particular embodiments of the present invention allow more than a single device to have network access (e.g., LAN access) through a single physical, access control port while maintaining security mechanisms. A device can be allowed to authenticate on a per-VLAN or domain basis. Accordingly, filtering can be accomplished on a per-VLAN or domain basis through a single port.

Although the foregoing invention has been described in some detail for purposes of clarity of understanding, it will be apparent that certain changes and modifications may be practiced within the scope of the appended claims. For example, although authentication has been described as authorizing a single device for accessing a single domain, of course, a single device may be authorized to access a plurality of different domains or multiple devices may be authorized to access a same domain. Therefore, the present embodiments are to be considered as illustrative and not restrictive and the invention is not to be limited to the details given herein, but may be modified within the scope and equivalents of the appended claims.

What is claimed is:

1. A method comprising:
   receiving one or more first authentication packets for authenticating a first device or user to access a first network domain via a particular access port of a network device, wherein the particular access port is configured to control access for packets attempting to ingress into one or more network domains;
   forming a first binding between the first device and the first domain based on whether the first device or user is authorized to access the first domain, wherein the first binding specifies that the first device is allowed to access the first domain and the first binding is associated with the particular access port of the network device;
   either allowing or blocking an ingressing packet to access the first domain via the particular access port based on whether or not the ingressing packet matches the first binding;
   receiving one or more second authentication packets for authenticating a second device or user to access a second network domain via the particular access port of the network device;
   forming a second binding between the second device and the second domain based on whether the second device or user is authorized to access the second domain, wherein the second binding specifies that the second device is allowed to access the second domain and is associated with the particular access port of the network device; and
   either allowing or blocking the ingressing packet to access the second domain via the particular access port based on whether or not the ingressing packet matches the second binding.

2. A method as recited in claim 1, wherein the first domain is a first virtual local area network (VLAN) and the second domain is a second VLAN.

3. A method as recited in claim 1, wherein the first device is coupled to the particular access port and the second device and wherein the second device communicates with particular access port via the first device.

4. A method as recited in claim 2, wherein the first binding is between a media access address (MAC) of the first device and the first VLAN and wherein the second binding is between a media access address (MAC) of the second device and the second VLAN.

5. A method as recited in claim 2, wherein the first and second authentication packets and the ingress packets are sent using the 802.1X protocol.

6. A method as recited in claim 3, wherein the first VLAN is configured for voice traffic and the second VLAN is configured for data traffic.

7. A method as recited in claim 6, wherein the first device is an Internet Protocol (IP) telephone and the second device is a personal computer (PC).

8. A method as recited in claim 1, wherein the first device is authorized to access the first domain when an unauthorized user that is utilizing the first device is determined to be authorized to access the first domain.

9. A method as recited in claim 1, further comprising blocking any devices from accessing any domains that are not specified by the first binding or any other binding that specifies access to a particular domain.

10. An apparatus comprising:
    one or more processors;
    one or more memory, wherein at least one of the processors and memory are adapted for:
    receiving one or more first authentication packets for authenticating a first device or user to access a first network domain via a particular access port of a network device,
    wherein the particular access port is configured to control access for packets attempting to ingress into one or more network domains;
    forming a first binding between the first device and the first domain based on whether the first device or user is authorized to access the first domain, wherein the first binding specifies that the first device is allowed to access the first domain and the first binding is associated with the particular access port of the network device;
    either allowing or blocking an ingressing packet to access the first domain via the particular access port based on whether or not the ingressing packet matches the first binding;
    receiving one or more second authentication packets for authenticating a second device or user to access a second network domain via the particular access port of the network device;
    forming a second binding between the second device and the second domain based on whether the second device or user is authorized to access the second domain, wherein the second binding specifies that the second device is allowed to access the second domain and is associated with the particular access port of the network device; and
    either allowing or blocking the ingressing packet to access the second domain via the particular access port based on whether or not the ingressing packet matches the second binding.

11. An apparatus as recited in claim 10, wherein the first domain is a first virtual local area network (VLAN) and the second domain is a second VLAN.

12. An apparatus as recited in claim 10, wherein the first device is coupled to the particular access port and the second device and wherein the second device communicates with particular access port via the first device.

13. An apparatus as recited in claim 11, wherein the first binding is between a media access address (MAC) of the first device and the first VLAN and wherein the second binding is between a media access address (MAC) of the second device and the second VLAN.

14. An apparatus as recited in claim 11, wherein the first and second authentication packets and the ingress packets are sent using the 802.1X protocol.

15. An apparatus as recited in claim 12, wherein the first VLAN is configured for voice traffic and the second VLAN is configured for data traffic.

16. An apparatus as recited in claim 15, wherein the first device is an Internet Protocol (IP) telephone and the second device is a personal computer (PC).

17. An apparatus as recited in claim 10, wherein the first device is authorized to access the first domain when an unauthorized user that is utilizing the first device is determined to be authorized to access the first domain.

18. An apparatus as recited in claim 10, wherein the at least one of the processors and memory are further adapted for blocking any devices from accessing any domains that are not specified by the first binding or any other binding that specifies access to a particular domain.

19. An apparatus comprising:
    means for receiving one or more first authentication packets for authenticating a first device or user to access a first network domain via a particular access port of a network device, wherein the particular access port is configured to control access for packets attempting to ingress into one or more network domains;

means for forming a first binding between the first device and the first domain based on whether the first device or user is authorized to access the first domain wherein the first binding specifies that the first device is allowed to access the first domain and the first binding is associated with the particular access port of the network device;

means for either allowing or blocking an ingressing packet to access the first domain via the particular access port based on whether or not the ingressing packet matches the first binding;

means for receiving one or more second authentication packets for authenticating a second device or user to access a second network domain via the particular access port of the network device;

means for forming a second binding between the second device and the second domain based on whether the second device or user is authorized to access the second domain, wherein the second binding specifies that the second device is allowed to access the second domain and is associated with the particular access port of the network device; and means for either allowing or blocking the ingressing packet to access the second domain via the particular access port based on whether or not the ingressing packet matches the second binding.

* * * * *